US012683865B2

(12) United States Patent
Wu et al.

(10) Patent No.: US 12,683,865 B2
(45) Date of Patent: Jul. 14, 2026

(54) METHOD FOR CONFIGURING NETWORK TRAFFIC AND COMPUTER SYSTEM THEREOF

(71) Applicant: REALTEK SEMICONDUCTOR CORP., Hsinchu (TW)

(72) Inventors: Tsai-Wei Wu, Hsinchu (TW);
Hsu-Tung Wang, Hsinchu (TW);
Yi-Kuan Wu, Hsinchu (TW);
Ming-Chieh Li, Hsinchu (TW);
Meng-Ju Lin, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 305 days.

(21) Appl. No.: 18/119,356

(22) Filed: Mar. 9, 2023

(65) Prior Publication Data

US 2023/0300031 A1     Sep. 21, 2023

Related U.S. Application Data

(60) Provisional application No. 63/321,804, filed on Mar. 21, 2022.

(30) Foreign Application Priority Data

Jun. 6, 2022     (TW) .................................. 111120781

(51) Int. Cl.
*H04L 41/0896*     (2022.01)
*G06F 9/54*     (2006.01)

(52) U.S. Cl.
CPC .......... *H04L 41/0896* (2013.01); *G06F 9/544* (2013.01); *G06F 9/545* (2013.01)

(58) Field of Classification Search
CPC ....... H04L 41/0896; G06F 9/544; G06F 9/545
See application file for complete search history.

(56) References Cited

U.S. PATENT DOCUMENTS 10,666,566  B2     5/2020   Lin et al.
11,507,485  B2     11/2022  Hung et al.
(Continued)

FOREIGN PATENT DOCUMENTS

CN          112134813  A   * 12/2020
CN          110138797  B     12/2021
(Continued)

OTHER PUBLICATIONS

T. Weng, W. Yang, G. Yu, p. Chen, J. Cui and C. Zhang, "Kmon: An In-kernel Transparent Monitoring System for Microservice Systems with eBPF," 2021 IEEE/ACM International Workshop on Cloud Intelligence (CloudIntelligence), Madrid, Spain, 2021, pp. 25-30 (Year: 2021).*

*Primary Examiner* — Emmanuel L Moise
*Assistant Examiner* — Robert A Shaw
(74) *Attorney, Agent, or Firm* — Li & Cai Intellectual Property (USA) Office

(57)     ABSTRACT

A method for configuring network traffic and a computer system are provided. The computer system includes a processing unit and a network module that is operated based on a bandwidth configuration. The processing unit operates an operating system that executes a profiling-controlling program. The method is performed in the operating system. In the method, the operating system initiates a system kernel, and the profiling-controlling program can obtain kernel operation information from the system kernel, so that information of multiple applications operating in a foreground process and a background process of the operating system can be retrieved. A priority order is decided, and a network bandwidth configuration is formed and written into traffic control instructions of the system kernel or a driver of the network module. The network bandwidth configuration
(Continued)

allows the operating system to perform a traffic configuration on each of the applications.

15 Claims, 5 Drawing Sheets

(56)                    References Cited

U.S. PATENT DOCUMENTS

| | | | |
|---|---|---|---|
| 11,880,293 B1* | 1/2024 | Hendrix ................ | G06F 11/362 |
| 2004/0215811 A1* | 10/2004 | Bar ........................ | H04L 69/329 |
| | | | 709/232 |
| 2005/0010765 A1* | 1/2005 | Swander ................. | H04L 63/20 |
| | | | 713/166 |
| 2009/0274045 A1* | 11/2009 | Meier ..................... | H04L 12/66 |
| | | | 370/468 |
| 2012/0036513 A1* | 2/2012 | Choong ............. | H04L 47/2475 |
| | | | 718/104 |
| 2012/0185597 A1 | 7/2012 | Luna | |
| 2013/0304796 A1* | 11/2013 | Jackowski .............. | H04L 65/80 |
| | | | 709/202 |
| 2015/0019740 A1* | 1/2015 | Zhao ................... | H04L 41/5022 |
| | | | 709/226 |
| 2016/0007233 A1* | 1/2016 | Rao ..................... | H04W 72/569 |
| | | | 455/452.2 |
| 2016/0261472 A1 | 9/2016 | Tubi et al. | |
| 2017/0285977 A1* | 10/2017 | Zhou ...................... | G06F 3/0673 |
| 2017/0286171 A1* | 10/2017 | Apparao ............... | G06F 12/023 |
| 2017/0329655 A1* | 11/2017 | Yuan ........................ | G06F 9/485 |
| 2017/0337083 A1 | 11/2017 | Wu et al. | |
| 2017/0364449 A1* | 12/2017 | Liu ........................ | G06F 9/5016 |
| 2018/0139645 A1* | 5/2018 | Yu .......................... | G06F 9/5011 |
| 2022/0147542 A1* | 5/2022 | Asgar ................... | G06F 11/323 |
| 2022/0197702 A1* | 6/2022 | Balasubramanian ........................ | |
| | | | G06F 12/123 |
| 2022/0197772 A1* | 6/2022 | Balasubramanian ........................ | |
| | | | G06F 11/3037 |
| 2022/0365823 A1* | 11/2022 | Le Garjan ............ | G06F 9/5016 |
| 2023/0036737 A1* | 2/2023 | Carbon-Ogden .... | G06N 3/0475 |
| 2023/0066013 A1* | 3/2023 | Ball ...................... | G06F 21/606 |
| 2023/0221975 A1* | 7/2023 | Sommers ............ | G06F 9/44526 |
| | | | 718/1 |
| 2023/0259399 A1* | 8/2023 | Rao ..................... | G06F 11/3442 |
| | | | 718/104 |
| 2023/0362284 A1* | 11/2023 | Waskiewicz, Jr. ...... | H04L 69/22 |
| 2025/0036580 A1* | 1/2025 | Xu ....................... | G06F 13/1668 |

FOREIGN PATENT DOCUMENTS

| | | |
|---|---|---|
| CN | 113886447 A | 1/2022 |
| TW | 202121167 A | 6/2021 |
| WO | WO2017167131 A1 | 10/2017 |

* cited by examiner

METHOD FOR CONFIGURING NETWORK TRAFFIC AND COMPUTER SYSTEM THEREOF

CROSS-REFERENCE TO RELATED PATENT APPLICATION

This application claims the benefit of priorities to the U.S. Provisional Patent Application Ser. No. 63/321,804 filed on Mar. 21, 2022 and Taiwan Patent Application No. 111120781 filed on Jun. 6, 2022, which applications are incorporated herein by reference in their entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for configuring network traffic, and more particularly to a method and a computer system that monitor network traffic based on information of a foreground process and a background process retrieved by an operating system kernel.

BACKGROUND OF THE DISCLOSURE

It is common for a computer system to operate multiple applications at the same time. If the multiple applications simultaneously utilize a limited network bandwidth, network traffic thereof may affect each other. The applications running in the computer system include, for example, video streaming, data transferring, network gaming, video conferencing, and online learning applications. These applications generally occupy a huge amount of network traffic, and may not be able to run smoothly over the network if the computer system lacks a good network control mechanism or fails to set up a priority order.

In the conventional technology, a smart traffic control program running in a specific operating platform is provided. For example, CFosSpeed is used for urgent processing of network traffic, and Realtek Dragon is applied to a gaming platform for controlling network bandwidth.

Since more and more services (such as gaming and video streaming) are running on the network, user-end applications require a larger network bandwidth and a better traffic control technology to satisfy increasing requirements for network bandwidth. With regard to a user-end environment, different operating environments may require different solutions, which can cause difficulties in use. Thus, as cross-platform services are provided by more and more network platform operators, the user-end environment is in need of a network management solution for cross-operating systems.

SUMMARY OF THE DISCLOSURE

In response to the above-referenced technical inadequacies, the present disclosure provides a method for configuring network traffic and a computer system that performs this method. When the computer system operates multiple applications at the same time and those applications affect each other with respect to use of a network bandwidth, a smart traffic management mechanism is adopted in the method for effectively improving management of the network bandwidth.

In one aspect of the present disclosure, the computer system performs the method for configuring network traffic. The computer system operates an operating system by a processing unit. A profiling-controlling program is executed in the operating system, and is used for controlling network traffic. The computer system further includes a network module that is driven by a driver executed in the operating system for providing a networking service.

In the method for configuring network traffic (which is operated in the operating system), the operating system initiates a system kernel, and extracts kernel operation information from the system kernel via the profiling-controlling program. In this way, information of the applications running in a foreground process and a background process can be obtained and used for deciding a priority order, so as to perform a network bandwidth configuration on the applications.

Further, the profiling-controlling program performed in the operating system can be divided into a profiling routine and a controlling routine. The kernel operation information is retrieved in real time by the profiling routine, and the controlling routine performs the network bandwidth configuration after being notified.

In certain embodiments, the profiling routine and the controlling routine in the operating system are integrated into one operating procedure, or are two separate operating procedures that are able to communicate with each other or two separate operating procedures that share a shared memory.

Further, the controlling routine determines whether each of the applications operates in the foreground process or in the background process according to scores assigned to the applications by the operating system, so as to decide the priority order of each of the applications. The profiling-controlling program can be a packet filtering program loaded to the system kernel in an initial phase of the operating system.

When the packet filtering program is used to retrieve the kernel operation information, information of a kernel network stack can be obtained. The information of the kernel network stack includes information of packets under multiple network transmission protocols.

Preferably, the network bandwidth configuration sets up a traffic configuration for each of the applications according to the priority order, and writes the traffic configuration into traffic control instructions of the system kernel or into a driver, so as to control a network module to perform the network bandwidth configuration.

Further, the computer system provides a visualized profiling-controlling user interface, which allows a user to adjust the priority order of the applications running in the foreground process and the background process. Therefore, the profiling routine can obtain changes of the priority order in real time, and the controlling routine can once again conduct the network bandwidth configuration.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
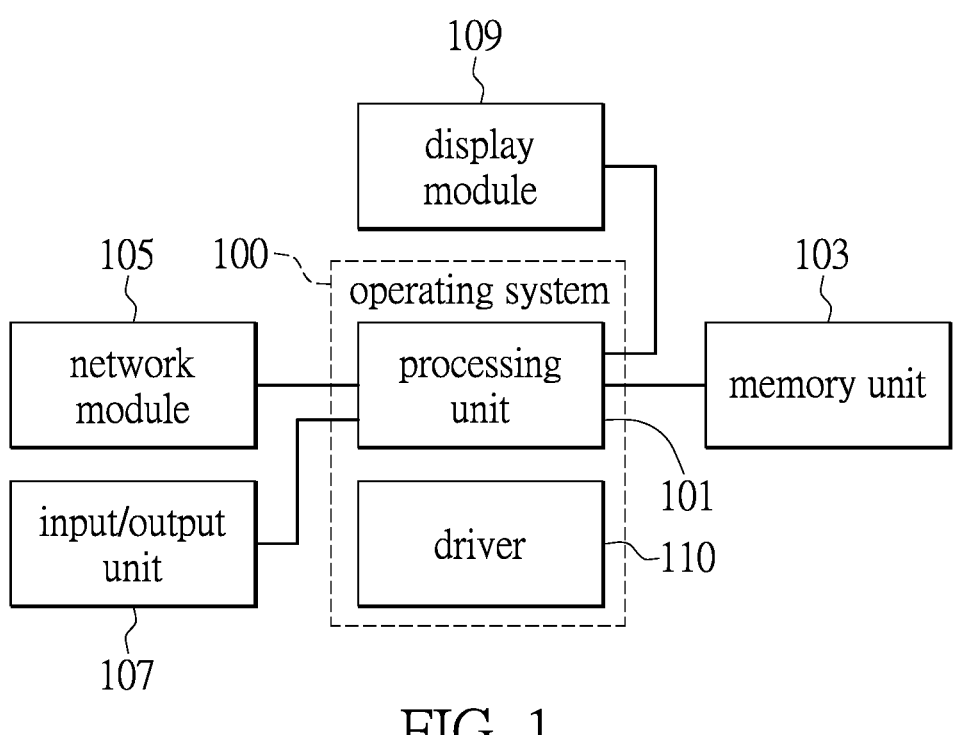
FIG. 1 is a schematic diagram showing a framework of a computer system that performs a method for configuring network traffic according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

A computer system may operate a plurality of applications at the same time. The applications that need access to a network can be, for example, a video streaming application, a data transferring application, a network gaming application, a video conferencing application, and other applications that are used to transfer data among users. In a network environment with a limited bandwidth, the applications that operate at the same time may interfere with each other and result in insufficiency of the network bandwidth. The present disclosure provides a method for configuring network traffic, which can automatically configure the network bandwidth according to operation information of each of the applications in the computer system. Therefore, the applications can use the network bandwidth appropriately under different conditions.

Some examples are provided below. In a first scenario, if a user plays a network game while downloading school curriculum videos, a huge amount of data to be downloaded may cause the network game to lag. In a second scenario, the user is in a network video conference while a specific application runs in a background process of a user device. If the application is in an update process, the smoothness of the video conference may be negatively affected. In a third scenario, the user plays two network games at the same time, in which one of the network games runs in the background process and another one of the network games runs in a foreground process. The two network games are bound to interfere with each other. That is, the network game running in the foreground process may lag due to the network game running in the background process. In a fourth scenario, when the user is taking an online class, and course files need to be downloaded at the same time, the online class may be affected by the process of downloading the course files. In a fifth scenario, the user is using a player to play a 4K network video from a specific audiovisual platform, and the smoothness of the streaming video may be affected due to some applications that run in the background process at the same time. Therefore, when the computer system performs the method for configuring network traffic provided in the present disclosure, an automatic network bandwidth configuration can be provided according to the status of the applications running in the foreground process or in the background process, and the user is allowed to flexibly adjust the network configuration.

FIG. 1 is a schematic diagram showing a framework of the computer system that performs the method for configuring network traffic. The computer system uses a processing unit 101 to operate an operating system 100. The operating system 100 initializes peripheral components of the computer system. The peripheral components can be, for example, a memory unit 103, a network module 105, an input/output unit 107 and a display module 109 that are electrically connected with the processing unit 101. A driver 110 executed in the operating system 100 drives various peripheral circuit components. For example, the network module 105 needs a proprietary driver to drive a network interface card (NIC) thereof.

In the method for configuring network traffic (which is performed in the computer system), the operating system (e.g., Linux OS) performs a profiling-controlling program. According to one embodiment of the present disclosure, the profiling-controlling program can be a packet filtering program that is loaded to a system kernel (e.g., Linux kernel) from the memory unit 103 in an initial phase after the operating system of the computer system is booted. It should be noted that the packet filtering program can be an extended Berkeley packet filter (eBPF) loaded in the Linux operating system. In one embodiment of the present disclosure, the profiling-controlling program can be divided into a profiling routine and a controlling routine. The profiling routine is used to retrieve kernel operation information from a specific location (e.g., an out-of-memory trace point) of the system kernel in real time. The kernel operation information is notified to the controlling routine, and then the controlling routine performs the network bandwidth configuration.

In one embodiment of the present disclosure, the above-mentioned profiling routine and the controlling routine in the operating system can be integrated into one operating procedure, or can be two separate operating procedures that are able to communicate with each other or two separate operating procedures that share a shared memory.

Figure 2:
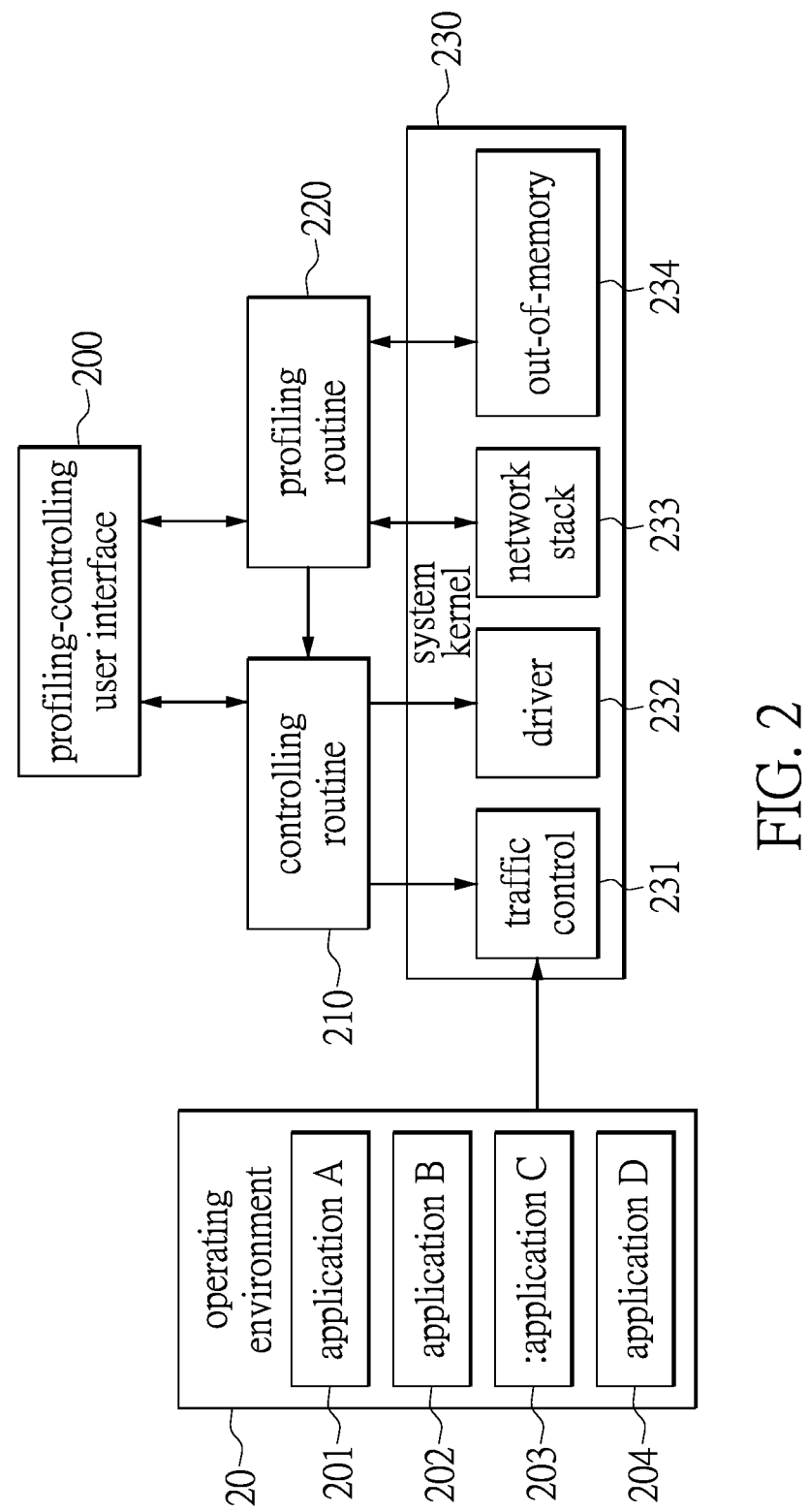
FIG. 2 is a schematic diagram showing a system that performs the method for configuring network traffic according to one embodiment of the present disclosure.

Reference is made to FIG. 2, which is a schematic diagram showing a framework of the system that performs the method for configuring network traffic according to one embodiment of the present disclosure.

In the present embodiment of the present disclosure, the computer system initiates an operating environment 20 through the operating system. Multiple applications are operated in the operating environment 20. The applications include an application A 201, an application B 202, an application C 203 and an application D 204 shown in the diagram. One of the applications (e.g., the application manipulated by the user for playing a streaming video) runs in the foreground process, while other applications run in the background process. Since the applications running in the background process may also require different network bandwidths, the computer system that executes the applications needs to perform a flexible network bandwidth configuration.

The computer system provides a text-based or GUI-based profiling-controlling user interface 200 that is used to monitor the applications which are running in the foreground process or in the background process. A manipulation interface initiated by the profiling-controlling user interface 200 allows the user to manually adjust a priority order of the applications which are running in the foreground process or in the background process. Therefore, the profiling-controlling program conducts the network bandwidth configuration for dynamically deciding the priority order of the applications, so as to flexibly provide the network bandwidth for the applications.

In one embodiment of the present disclosure, in an initial phase of the operating system, the profiling-controlling program is loaded to a system kernel 230. A profiling routine 220 of the profiling-controlling program can retrieve the kernel operation information from a specific location in the system kernel 230. The profiling routine 220 can actively or passively retrieve information from the system kernel 230. For example, the profiling routine 220 can retrieve information of network stack 233 or out-of-memory 234. In one exemplary example, network packets pass through a kernel network stack of the system kernel 230, such that information of packets under multiple network transmission protocols can be obtained from information of the kernel network stack. The profiling routine 220 retrieves network traffic information according to the network stack 233. For example, operating information of the network interface card that is at a lowest physical layer of the network stack can be retrieved by the profiling routine 220. Further, information of the network transmission protocols (such as TCP/IP and UDP/IP) can also be retrieved by the profiling routine 220. Still further, in addition to a network interface card driver, information of other drivers for the various network transmission protocols and transmission applications operated in the operating system can also be retrieved by the profiling routine 220.

Furthermore, the profiling routine 220 can obtain a score of each of the applications running in the operating system based on the information of out-of-memory 234. The score can be referred to as an out-of-memory score (OOM score) that is used for the operating system to determine the priority order of running processes. Accordingly, the profiling routine 220 can determine whether the applications are running in the foreground process or in the background process. The operating system can designate a score to each of the applications according to the status of the applications. For example, the application is determined to be running in the foreground process if its score is within a numerical range, and the other applications are determined to be running in the background process if their scores are outside the numerical range. In certain applications, a lower score indicates a higher degree of importance of the application, and a higher score indicates a lower degree of importance of the application. Therefore, the score can be referred to for determining which procedure should be terminated by a kill command. Alternatively, the score can be provided for the profiling routine 220 to determine an actual network bandwidth required by each of the applications.

If the profiling routine 220 retrieves the kernel operation information in real time, the controlling routine 210 is then notified. The operating system can conduct the network bandwidth configuration through the controlling routine 210. For example, the priority order of the applications (e.g., the application A 201, the application B 202, the application C 203, and the application D 204) can be decided according to the out-of-memory scores of the applications. Further, the network bandwidth allocated to each of the application can also be decided. The relevant rule can be written into the configuration of the system kernel 230. For example, the rule can be written into a traffic control 231 (e.g., a Linux traffic control) of the system kernel 230, and the traffic control 231 can be implemented as a traffic controlling routine. Alternatively, the traffic configuration can be written into a driver 232 of a network interface. Either approach can achieve network traffic configuration, but a better result can be achieved when the two approaches are used together. When the controlling routine 210 retrieves the kernel operation information relating to the foreground process, the background process, and the network, the traffic control 231 and the driver 232 can perform a smart traffic management for controlling the network module to conduct the network bandwidth configuration. One traffic configuration can be set for each of the applications according to the priority order.

Figure 3:
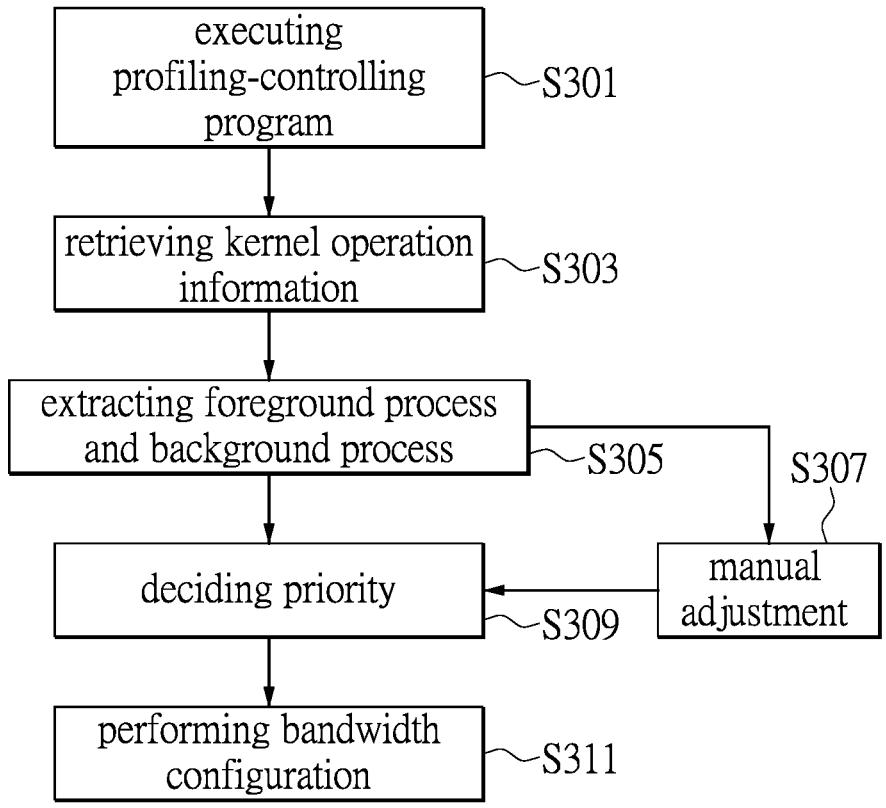
FIG. 3 is a flowchart of the method for configuring network traffic according to one embodiment of the present disclosure.

FIG. 3 is a flowchart of the method for configuring network traffic according to one embodiment of the present disclosure. The flowchart illustrates major steps of the method for configuring network traffic.

In the flowchart, a computer system starts an operating system after a booting process, and initiates a system kernel. In this initial phase, a profiling-controlling program is loaded from a memory of the computer system and executed in the operating system (step S301). The profiling-controlling program can retrieve kernel operation information from a specific location of the system kernel (step S303). According to the above embodiment, the applications which are running in the foreground process or in the background process can be determined (step S305). The information (e.g., the above-mentioned out-of-memory score) of the applications running in the foreground process and in the background process can be referred to for deciding the priority order in real time (step S309). In the meantime, the user can access the information generated by the system kernel through the profiling-controlling program (i.e., the profiling routine and the controlling routine) when the user manipulates the profiling-controlling user interface shown in FIG. 2. The profiling-controlling user interface allows the user to monitor the status of the applications and to obtain the status of the network bandwidth used by the application. If the user manually adjusts and decides the priority order of the applications via the profiling-controlling user interface (i.e., steps S307 and S309), the profiling-controlling program dynamically adjusts the network bandwidth allocated to each of the applications according the priority order adjusted by the user (step S311).

According to one embodiment of the present disclosure, when conducting the network bandwidth configuration, the packet filtering program retrieves the information of the kernel network stack included in the kernel operation information. In addition to deciding the priority order of the applications based on whether the applications are running in the foreground process or in the background process, the network packet information in the kernel operation information retrieved from the system kernel can also be referred to for determining the priority order. In some specific applications, the priority order can be determined by referring to a port number and a network transmission protocol (e.g., TCP/UDP) of the network packet. For example, the network packets produced by the applications can be designated with specific port numbers by the driver of the network module, and the network packets with the specified port numbers are given a high priority to pass.

Figure 4:
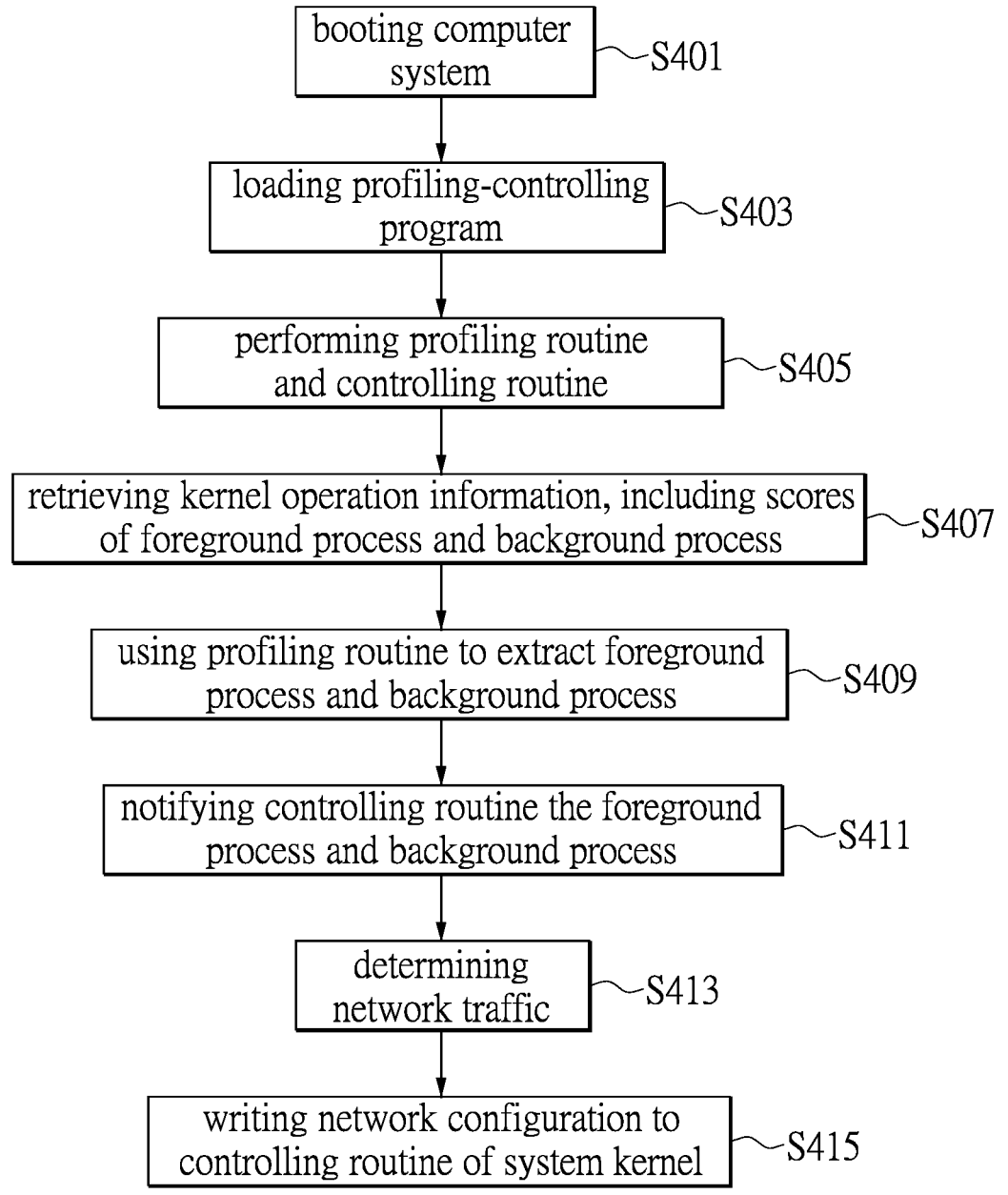
FIG. 4 is a flowchart of the method for configuring network traffic according to another embodiment of the present disclosure.

Reference is further made to FIG. 4, which is a flowchart of the method for configuring network traffic according to another embodiment of the present disclosure. The computer system can be a Linux system. After the computer system is booted and the hardware is initialized (step S401), the computer system enters a system kernel (e.g., a Linux kernel), and loads the profiling-controlling program (step S403). The profiling routine and the controlling routine in the profiling-controlling program are executed (step S405) for retrieving kernel operation information from a specific location of the system kernel. For example, the specific location of the system kernel records the scores of the applications running in the foreground process and in the background process and the information of network packets (step S407). Therefore, the information of the applications running in the foreground process and in the background process can be retrieved through the profiling routine (step S409).

According to one embodiment of the present disclosure, the profiling routine notifies the controlling routine of the information relating to the applications running in the foreground process or in the background process and the information of the network packets (step S411). The controlling routine then determines how to configure the network traffic based on the priority order of the applications and the instantaneous information (e.g., the port number of the network packets produced by the applications and the network transmission protocol) of the network packets, so as to generate a setting for network traffic configuration (step S413). The network configuration is written into a traffic controlling routine of the system kernel or the driver of the network interface card in the network module (step S415). Accordingly, the smart traffic management can be achieved.

According to the flowchart of the method for configuring network traffic described in the above embodiments, the above-mentioned problems can be solved in the following manner.

In the first scenario, if the user plays the network game while downloading the school curriculum videos, the huge amount of data to be downloaded may cause the network game to lag. In one exemplary example of the present disclosure, when the user clicks to download one of the curriculum videos and plays the network game at the same time, the network game is determined to be a foreground process according to the kernel operation information. According to the score (e.g., the OOM score) of the foreground process given by the computer system, the profiling routine of the profiling-controlling program retrieves the information of the applications running in the foreground process and in the background process, and the controlling routine sets up a priority order to be written into the traffic controlling routine of the system kernel or the network interface card driver.

In the second scenario, the user is in the network video conference while the specific application runs in the background process of the user device. If the application is in the update process, the smoothness of the video conference may be negatively affected. The applications that generally run in the background process are, for example, a calendar application, an electronic mail application, a weather application, a news application and an instant messaging application. Suppose the network video conference runs in the foreground process, when the profiling routine retrieves the information of the applications running in the foreground process and in the background process, the controlling routine sets up the priority order to be written into the traffic controlling routine of the system kernel and the network interface card driver, and a larger network bandwidth can be provided to the network video conference that runs in the foreground process.

In the third scenario, the user plays the two network games at the same time, in which one of the network games runs in the background process and another one of the network games runs in the foreground process. The two network games are bound to interfere with each other. The network game running in the foreground process may lag due to the network game running in the background process. In one exemplary example, the network game running in the background process only uploads data to a gaming server. Therefore, such a data uplinking process can be assigned with a lower priority since a little delay is acceptable in this process. However, the network game running in the foreground process needs to be given a higher priority since any lag in the current network game may be unacceptable for the user.

In the fourth scenario, when the user is taking the online class, and the course files need to be downloaded at the same time, the online class may be affected by the process of downloading the course files. In one exemplary example, a teacher at school asks students to download homework files when the students are in a video class. The file-downloading process generally runs in the background process and can be assigned with a lower priority. The video class that runs in the foreground process can be given a higher priority, so that the video class will not be affected by the file-downloading process.

In the fifth scenario, the user is using the player to play the 4K network video from the specific audiovisual platform, and the smoothness of the streaming video may be affected due to some applications that run in the background process at the same time. In one exemplary example, based on the smoothness requirement of the streaming video, a video-streaming application that runs in the foreground process is given a higher priority by the controlling routine of the system kernel.

Figure 5:
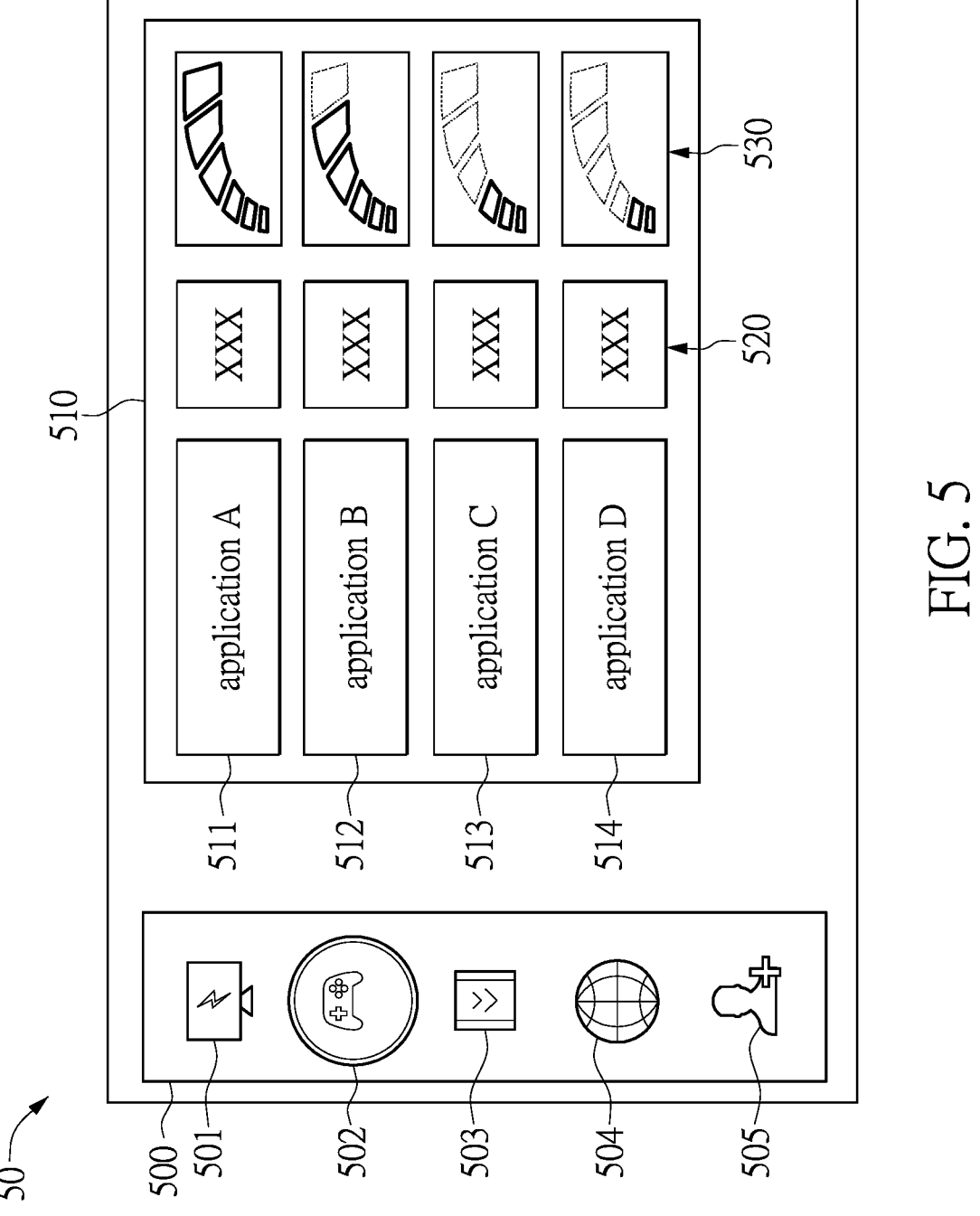
FIG. 5 is a schematic diagram of a user manipulation interface initiated in the method for configuring network traffic according to one embodiment of the present disclosure.

In the method for configuring network traffic, the computer system also provides a profiling-controlling user interface that allows the user to adjust the priority order of the multiple applications running in the foreground process and in the background process. Reference is made to FIG. 5, which is a schematic diagram of a user manipulation interface according to one embodiment of the present disclosure.

The diagram shows a visualized GUI-implemented manipulation interface 50. The profiling routine retrieves the scores of the applications running in the foreground process and in the background process and use information of the network bandwidth, and such information can be shown on the manipulation interface 50 that provides various adjustment functions for the user.

The manipulation interface 50 shows a mode-selection interface 500, which is provided for the user to select one setting of the network traffic configuration according to practical needs. For example, an auto mode 501 allows the system to configure the network traffic according to a default rule of the profiling-controlling program. A game mode 502 set in the network traffic configuration is to assign a higher priority to the gaming applications, such that the smoothness of the game is guaranteed by a higher weight. A streaming mode 503 is to assign a higher priority to the video streaming application for guaranteeing a better viewing experience. A web mode 504 allows the user to browse web pages with a guaranteed network bandwidth by assigning a higher priority to a browser. Further, a user definition 505 allows the user to set up the priority order of the applications in using the network bandwidth according to his/her need.

On the other hand, a priority profiling-controlling interface 510 is provided for showing that multiple applications (e.g., an application A 511, an application B 512, an application C 513 and an application D 514) are in operation. The order of the applications shown in the diagram is determined according to an order of the scores of the applications recorded in the kernel operation information. The information further includes a traffic statistics 520 and a priority order 530 with respect to each of the applications. The user can adjust the priority order of the applications with various input means and simultaneously confirm the current status of the smart traffic management.

In conclusion, the method for configuring network traffic provided by the present disclosure allows the information of the applications running in the foreground process and in the background process (which includes the information of the network packets) to be directly retrieved from the system kernel, so that the profiling-controlling program running in the operating system can dynamically allocate the network bandwidth to different applications according to the status of the applications. The network bandwidth can also be dynamically adjusted in real time. In this way, the smart network traffic management can be achieved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for configuring network traffic, which is performed in a computer system, the method comprising:

operating an operating system in the computer system and initiating a system kernel;

retrieving, by a profiling routine, kernel operation information from the system kernel, so as to obtain information of a plurality of applications operating in a foreground process and in a background process of the operating system; and deciding, according to the information of the applications operating in the foreground process and in the background process, a priority order of the plurality of applications by a controlling routine that determines whether each of the applications operates in the foreground process or in the background process according to a score;

wherein the score is an out-of-memory score used for the operating system to determine the priority order of the plurality of applications and is assigned to each of the applications based on a status of the application by the operating system; and the controlling routing performs a network bandwidth configuration on each of the applications when the controlling routine is notified by the profiling routine of an actual network bandwidth required by each of the applications according to the score assigned to each of the applications.

2. The method according to claim 1, wherein the operating system executes a profiling-controlling program that includes the profiling routine and the controlling routine.

3. The method according to claim 2, wherein the profiling routine and the controlling routine in the operating system are integrated into one operating procedure, or are two separate operating procedures that are able to communicate with each other or two separate operating procedures that share a shared memory.

4. The method according to claim 2, wherein the profiling-controlling program is a packet filtering program loaded to the system kernel in an initial phase of the operating system.

5. The method according to claim 4, wherein the packet filtering program is an extended Berkeley packet filter running in a Linux operating system.

6. The method according to claim 4, wherein the kernel operation information retrieved by the packet filtering program includes information of a kernel network stack, and the information of the kernel network stack includes information of packets under multiple network transmission protocols.

7. The method according to claim 1, wherein the network bandwidth configuration sets up a traffic configuration for each of the applications according to the priority order, and writes the traffic configuration into traffic control instructions of the system kernel or into a driver, so as to control a network module to perform the network bandwidth configuration.

8. The method according to claim 7, wherein the computer system provides a profiling-controlling user interface that allows a user to monitor operating statuses of the applications, to retrieve a status of network bandwidth usage of each of the applications, and to adjust the priority order of the applications running in the foreground process and in the background process.

9. A computer system, which performs a method for configuring network traffic, the computer system comprising:

a processing unit, wherein the processing unit operates an operating system, and the operating system executes a profiling-controlling program having a controlling routine and a profiling routine; and a network module, wherein the network module is electrically connected with the processing unit, and is driven by a driver executed in the operating system for providing a networking service;

wherein the method includes:

initiating a system kernel in the operating system;

retrieving, via the profiling routine of the profiling-controlling program, kernel operation information from the system kernel, so as to obtain information of a plurality of applications operating in a foreground process and in a background process of the operating system; and deciding a priority order of the plurality of applications operating in the foreground process and in the background process by the controlling routine that determines whether each of the applications operates in the foreground process or in the background process according to a score;

wherein the score is an out-of-memory score used for the operating system to determine the priority order of the plurality of applications and is assigned to each of the applications based on a status of the application by the operating system; and the controlling routine performs a network bandwidth configuration on each of the applications when the controlling routine is notified by the profiling routine of an actual network bandwidth required by each of the applications according to the score assigned to each of the applications.

10. The computer system according to claim 9, wherein the profiling routine and the controlling routine in the operating system are integrated into one operating procedure, or are two separate operating procedures that are able to communicate with each other, or two separate operating procedures that share a shared memory.

11. The computer system according to claim 9, wherein the profiling-controlling program is a packet filtering program loaded to the system kernel in an initial phase of the operating system.

12. The computer system according to claim 11, wherein the packet filtering program is an extended Berkeley packet filter running in a Linux operating system.

13. The computer system according to claim 11, wherein the kernel operation information retrieved by the packet filtering program includes information of a kernel network stack and the information of the kernel network stack includes information of packets under multiple network transmission protocols.

14. The computer system according to claim 9, wherein the network bandwidth configuration sets up a traffic configuration for each of the applications according to the priority order, and writes the traffic configuration into traffic control instructions of the system kernel or into the driver, so as to control the network module to perform the network bandwidth configuration.

15. The computer system according to claim 14, wherein the computer system provides a profiling-controlling user interface that allows a user to monitor operating statuses of the applications to retrieve a status of network bandwidth usage of each of the applications, and to adjust the priority order of the applications running in the foreground process and in the background process.

* * * * *